United States Patent
Makioka

(10) Patent No.: US 7,580,063 B2
(45) Date of Patent: Aug. 25, 2009

(54) DIGITAL CAMERA FOR OUTPUTTING IMAGE CORRECTION INFORMATION

(75) Inventor: Katsuya Makioka, Asaka (JP)

(73) Assignee: Fujifilm Corporation, Tokyo (JP)

( * ) Notice: Subject to any disclaimer, the term of this patent is extended or adjusted under 35 U.S.C. 154(b) by 357 days.

(21) Appl. No.: 10/430,427

(22) Filed: May 7, 2003

(65) Prior Publication Data

US 2004/0012690 A1 Jan. 22, 2004

(30) Foreign Application Priority Data

| May 7, 2002 | (JP) | ............................. 2002-131570 |
| May 7, 2002 | (JP) | ............................. 2002-131571 |
| May 7, 2002 | (JP) | ............................. 2002-131572 |

(51) Int. Cl.
*H04N 5/76* (2006.01)
*H04N 9/73* (2006.01)

(52) U.S. Cl. .............................. 348/231.3; 348/231.99; 348/223.1; 348/225.1

(58) Field of Classification Search .............. 348/223.1, 348/225.1, 231.99, 231.3
See application file for complete search history.

(56) References Cited

U.S. PATENT DOCUMENTS

| 5,270,802 | A | * | 12/1993 | Takagi et al. ................. 348/655 |
| 5,691,772 | A | * | 11/1997 | Suzuki ..................... 348/223.1 |
| 6,011,547 | A | * | 1/2000 | Shiota et al. ................. 382/254 |
| 6,642,957 | B1 | * | 11/2003 | Taura ....................... 348/223.1 |
| 6,650,365 | B1 | * | 11/2003 | Sato ........................ 348/231.3 |
| 6,963,363 | B1 | * | 11/2005 | Ohmura .................... 348/231.3 |
| 7,098,943 | B2 | * | 8/2006 | Shibutani ................. 348/211.1 |
| 2002/0135687 | A1 | * | 9/2002 | Nakajima et al. ........ 348/231.3 |
| 2003/0112342 | A1 | | 6/2003 | Takeuchi |

FOREIGN PATENT DOCUMENTS

| JP | 11-261933 A | 9/1999 |
| JP | 2001-223979 A | 8/2001 |
| JP | 2003-134530 A | 5/2003 |

* cited by examiner

*Primary Examiner*—James M Hannett
*Assistant Examiner*—Kelly L Jerabek
(74) *Attorney, Agent, or Firm*—Birch, Stewart, Kolasch & Birch, LLP

(57) ABSTRACT

A digital camera outputs image data received from an image pickup unit. Image information has the image data that include information indicating shift of a blackbody locus of the digital camera. Image information has the image data that include color gain information based on settings at the pick-up time, and color gain data, which were adjusted in advance for various types of light sources, for white balance process that is set manually. Image information has the image data includes color gain information based on settings at the pick-up time, and color gain information obtained by performing auto white balance process at the pick-up time.

27 Claims, 4 Drawing Sheets

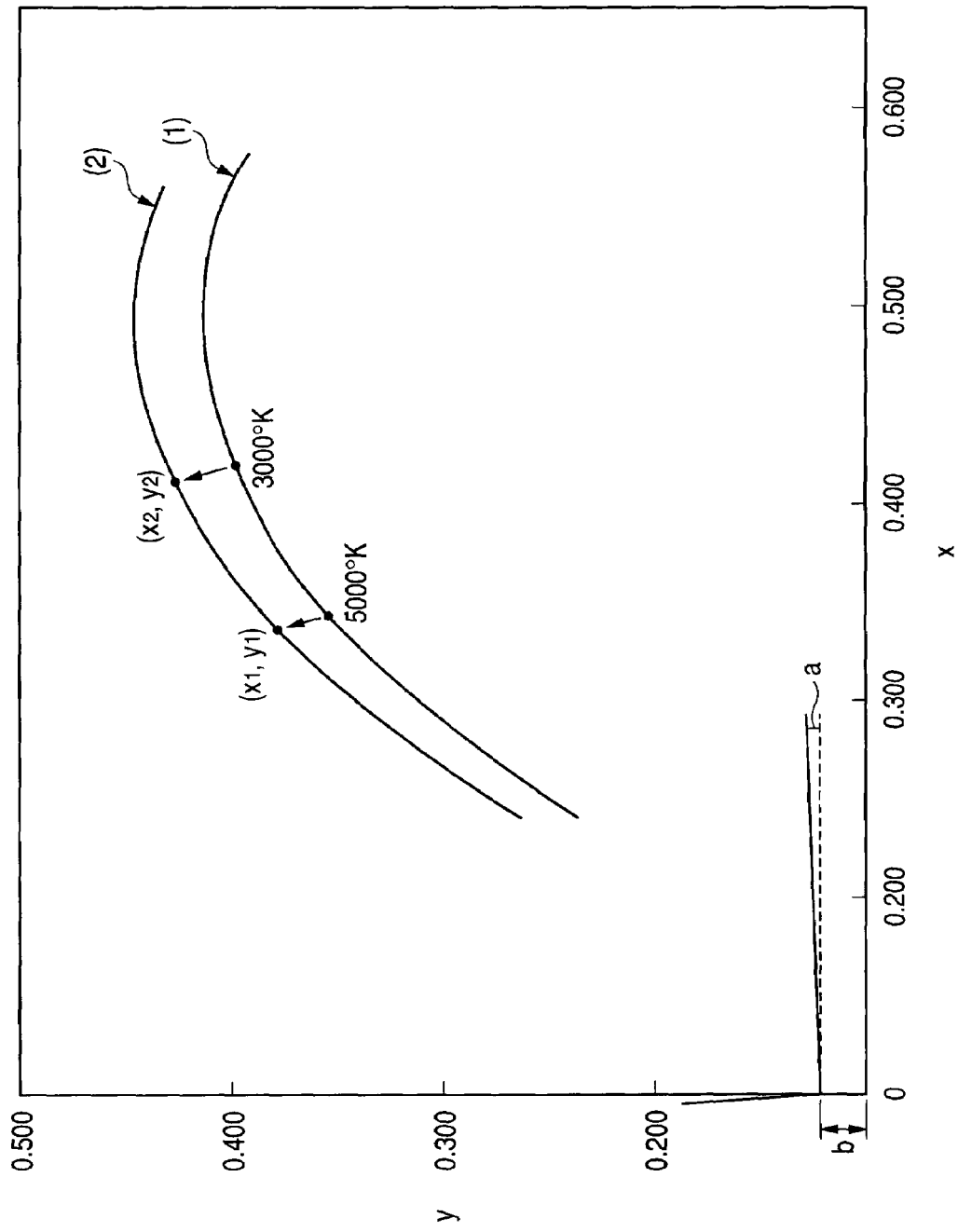

FIG. 5

| |
|---|
| R GAIN BY SETTINGS AT PICKUP TIME |
| G GAIN BY SETTINGS AT PICKUP TIME |
| B GAIN BY SETTINGS AT PICKUP TIME |
| R GAIN FOR MANUAL WB "SUN SHINING" |
| G GAIN FOR MANUAL WB "SUN SHINING" |
| B GAIN FOR MANUAL WB "SUN SHINING" |
| R GAIN FOR MANUAL WB "SHADE" |
| G GAIN FOR MANUAL WB "SHADE" |
| B GAIN FOR MANUAL WB "SHADE" |
| R GAIN FOR MANUAL WB "FLUORESCENT LIGHT D50" |
| G GAIN FOR MANUAL WB "FLUORESCENT LIGHT D50" |
| B GAIN FOR MANUAL WB "FLUORESCENT LIGHT D50" |
| R GAIN FOR MANUAL WB "ARTIFICIAL DAYLIGHT FLUORESCENT LIGHT" |
| G GAIN FOR MANUAL WB "ARTIFICIAL DAYLIGHT FLUORESCENT LIGHT" |
| B GAIN FOR MANUAL WB "ARTIFICIAL DAYLIGHT FLUORESCENT LIGHT" |

FIG. 6

| |
|---|
| R GAIN BY SETTINGS AT PICKUP TIME |
| G GAIN BY SETTINGS AT PICKUP TIME |
| B GAIN BY SETTINGS AT PICKUP TIME |
| R GAIN BY PERFORMING AUTO WB |
| G GAIN BY PERFORMING AUTO WB |
| B GAIN BY PERFORMING AUTO WB |

DIGITAL CAMERA FOR OUTPUTTING IMAGE CORRECTION INFORMATION

BACKGROUND OF THE INVENTION

1. Field of the Invention

The present invention relates to a digital camera for outputting image data, which is not processed, received from an image pickup unit.

2. Description of the Related Art

A digital camera enables a user to confirm an image, which will be picked up, by continuously displaying an image of an object before picking up an image. The digital camera also enables a user to confirm a picked-up image by reproducing and displaying the picked-up image immediately. Especially, the function that the digital camera reproduces a picked-up image immediately after picking up is convenient for user. In this case, the image data obtained by picking up are converted into image signal form, which is for appropriate for that an image display unit displays, and recorded on recording media. For example, a combination of luminance Y signal, color difference R-Y signal and color difference B-Y, or a combination of RGB signals are used for image signal form.

Another digital camera is proposed that can output image data, which is not processed, received from an image pickup unit having a CCD image pickup element (see JP-A-11-261933 or JP-A-2001-223979). When image data received from the image pickup unit (hereafter, it is called "RAW data" as image data, which is not processed, received from the image pickup unit.) are employed, an image signal can be obtained that reflects the pixel structure and the characteristic of the image pickup unit. Therefore, a user can perform an image correction process that does not deteriorate the image.

An example of image correction process for RAW data is a white balance (WB) control process. In the white balance control process, a gain for each color signal of RAW data is changed to obtain image data of appropriate tone of color. The digital camera has a white balance control function, which performs the white balance control process by using color gain data that are set by user before picking up an image. Image data, which the white balance control process was processed, are employed to convert to the image signal form that is appropriate for image reproduction.

A white balance can be manually set in accordance with light source condition (outdoors, shade, illumination) or also can be automatically adjusted and set (auto white balance) in accordance with the scene where is picked up. Color gain data, which is obtained in accordance with the settings, vary among cameras used for picking up even though the settings of each camera is same because of the type of CCD image pickup element and the characteristic difference of each element. Further, the auto white balance control process is performed by an algorithm in accordance with the type of camera and the characteristics of each camera.

Therefore, it is preferable to output RAW data with color gain data which were set before picking up. According to the camera disclosed in JP-A-2001-223979, color gain data for white balance, which were set before picking up, as parameter for image reproduction are added to RAW data.

An arbitrary correction process to the output RAW data can be performed by an external processor. Whereas, when a white balance control process is to be performed under various light source conditions, user may request to slightly control hue by setting each light source with a color temperature. As described above, however, since a color gain corresponding to each light source condition is varied among cameras, a first circumstance may occur to that an appropriate corrected image can not be obtained even by setting a light source condition in accordance with a color temperature.

In the case of that the color correction process to the output RAW data is performed, when a user finds that the settings in picking up an image is inappropriate, the user may want to adjust the image under different light source condition. As described above, however, since the color gain corresponding to each light source condition is varied among cameras, a second circumstance may occur to that the adjustment is in actuality difficult.

Although color gain data attached with the output RAW data are generally unclear about the settings, there is a case that an auto white balance control process is desired by using an external processor. However, even though a color gain is obtained through the analysis of a picking-up scene, as described above, a third circumstance may occur to that optimal auto white balance control is difficult due to the difference (a characteristic and a process algorithm) in individual cameras.

SUMMARY OF THE INVENTION

The first object of the invention is to provide a digital camera for outputting RAW data, which can perform a white balance control process under a light source condition set with a color temperature.

To achieve the first object, the invention provides a digital camera for outputting image data received from an image pickup unit, wherein image information having the image data includes information indicating shift of a blackbody locus of the digital camera. The information indicating the blackbody locus includes an inclination value and an offset value, or chromaticity information corresponding to specific color temperatures.

Thus, as the information indicating the shift of the blackbody locus of each digital camera are included in the image information, the color gain inherent to the digital camera corresponding to color temperature that was designated set can be obtained in the case that light source condition is set by the color temperature. Therefore, it enables to perform appropriate white balance process.

The second object of the invention is to provide a digital camera for outputting RAW data, which can perform a white balance control process under different light source conditions individually set for digital cameras after RAW data were outputted.

To achieve the second object, the invention provides a digital camera for outputting image data received from an image pickup unit, wherein image information having the image data includes color gain information based on setting at the pick-up time, and color gain data, which were adjusted in advance for various types of light sources, for white balance process that is set manually.

Thus, as the color gain information is included in RAW data, an image under more appropriate light source condition can be obtained even though the manual settings of light source condition was not appropriate. For example, even though an image was picked up under a fluorescent lamp with the settings of the daytime and outdoor, the RAW data can be corrected with color gain data of daytime and outdoor, which is inherent in the digital camera.

The third object of the invention is to provide a digital camera for outputting RAW data, which can perform an auto white balance control process unique to a digital camera after RAW data were outputted.

To achieve the third object, the invention provides a digital camera for outputting image data received from an image pickup unit, wherein image information having the image data includes color gain information based on settings at the pick-up time, and color gain information obtained by performing auto white balance process at the pick-up time.

Thus, as the color gain information is included in RAW data, RAW data can be corrected by the auto white balance process of the digital camera even though manual settings was not appropriate.

BRIEF DESCRIPTION OF THE DRAWINGS

FIG. 4 is a diagram showing a blackbody locus according to the xy chromaticity;

FIG. 5 is a diagram showing an example of color gain data;

FIG. 6 is a diagram showing an example of color gain data.

DETAILED DESCRIPTION OF THE PREFERRED EMBODIMENTS

Figure 1:
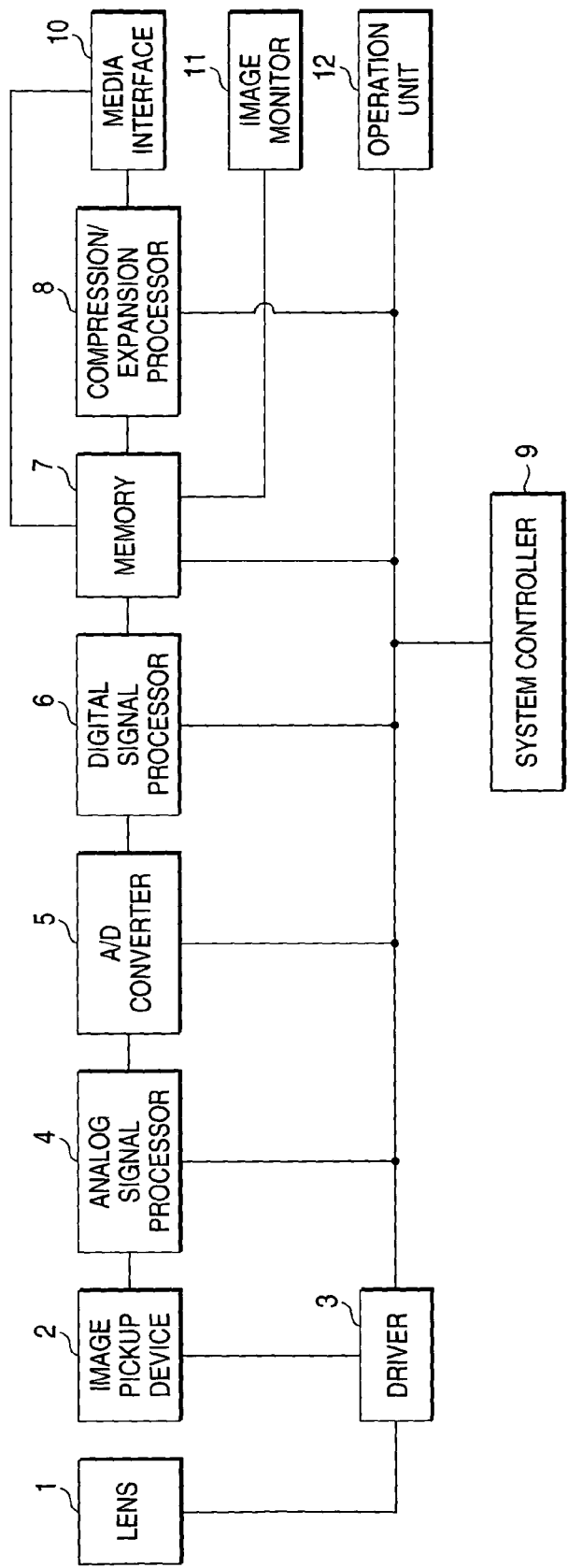
FIG. 1 is a diagrammatic diagram showing the configuration of a digital camera according to embodiments 1-3 of the present invention.

The preferred embodiments 1-3 of the present invention will now be described referring to the drawings. FIG. 1 is a diagrammatic diagram showing the configuration of a digital camera according to the following embodiments 1-3 of the present invention. The digital camera shown in FIG. 1 has an image pickup unit including a lens 1, an image pickup device 2 and a driver 3, a signal processing unit including an analog signal processor 4, an A/D converter 5, a digital signal processor 6, a memory for output (hereafter, it is just called "memory.") 7 and a compression/expansion processor 8, an output unit including a media interface 10 and an image monitor 11, an operation unit 12 including a mode select switch and a release button (not shown), and a system controller 9 which controls the overall digital camera.

Since the configuration of the image pickup unit is the same as that of a conventional digital camera, only a brief explanation for it will be given. Light passed through the lens 1 is focused on the image pickup device 2 such as a CCD, to obtain an image signal. When the image signal is obtained, the lens 1 and an aperture (not shown) are controlled by the driver 3. The image pickup device 2 is driven at a predetermined timing by the driver 3 including a timing generator (not shown) to output the image signal upon operation of the release button.

The image signal is analogue signal processed by the analogue signal processor 4, converted into digital signal by the A/D converter 5, and then transmitted to the digital signal processor 6 as RAW data. The digital signal processor 6 performs digital signal processing corresponding to an operating mode set by the operation unit 12. The image data generated by the digital signal processor 6 are temporarily stored in the memory 7.

The process performed by the digital signal processor 6 includes a white balance control, a Y/C process and a gamma correction process, etc. To display on the image monitor 11 an image based on the image data obtained through the digital image processing, the image data are read from the memory 7 and transmitted to the image monitor 11. The image data stored in the memory 7 are stored on a recording media (not shown) such as memory cards via the media interface 10 directly or after being compressed by the compression/expansion processor 8. The image monitor 11 can also display an image based on the image data stored on the recording media.

The system controller 9 controls the overall, including the picking-up operation, of the digital camera. The system controller 9 is includes a processor, which operates by a predetermined program. The system controller 9 also includes a memory for storing a program and various data required for operating, and a work memory.

The operation unit 12 is used to set various operations for the digital camera, for example, a pick-up method in picking up an image, a pick-up condition, settings about image information processing method, and settings about a recording mode on recording media. The operation unit 12 may have operation members corresponding to each function and also may share an operation member, to which the operation is linked with the display shown on the display monitor 11. One of the image conditions which are set is white balance, which includes the manual settings in accordance with a light source condition (outdoors, shade, illumination) and the auto settings that automatically adjusts white balance control in accordance with the pick-up scene. The recording modes include a recording mode for compressed image data and a recording mode for RAW data. Compression rate can be set when the recording mode for compressed image data is selected.

First Embodiment

The first embodiment is assumed that an image is picked up under the condition that "auto white balance" was set as the white balance control and "RAW data" was set as the recording mode. The digital signal processor 6 performs an auto white balance control process to the RAW data received from the A/D converter 5. The digital signal processor 6 further performs the gamma correction process, the interpolation process and the Y/C process to obtain image data that is an appropriate form to be able to display on the image monitor 11. The digital signal processor 6 outputs the obtained image data to the memory 7. The image monitor 11 displays a through image based on the image data. When the display of a through image is not required, the gamma correction, the interpolation process and the Y/C process are unnecessary to be performed.

When, in this state, the release button (not shown) of the operation unit 12 is depressed, the digital signal processor 6 performs the auto white balance control process to the received RAW data, obtains a color correction gain corresponding to a pick-up scene, and outputs the color correction gain with the RAW data to the memory 7.

The RAW data and the color correction gain data obtained by the auto white balance control process in the memory 7 are recorded through the media interface 10 on a recording media (not shown). Further, information indicating the shift of the blackbody locus of a digital camera is also recorded. Inclination value and offset value, or chromaticity information corresponding to a specific color temperature is employed as the information indicating the shift. The image associated information is also recorded on the recording media (not shown) as one image file. The pick-up operation and the recording operation are controlled by the system controller 9. The information indicating the shift of the blackbody locos for each digital camera is the one stored in a memory (not shown).

Figure 2:
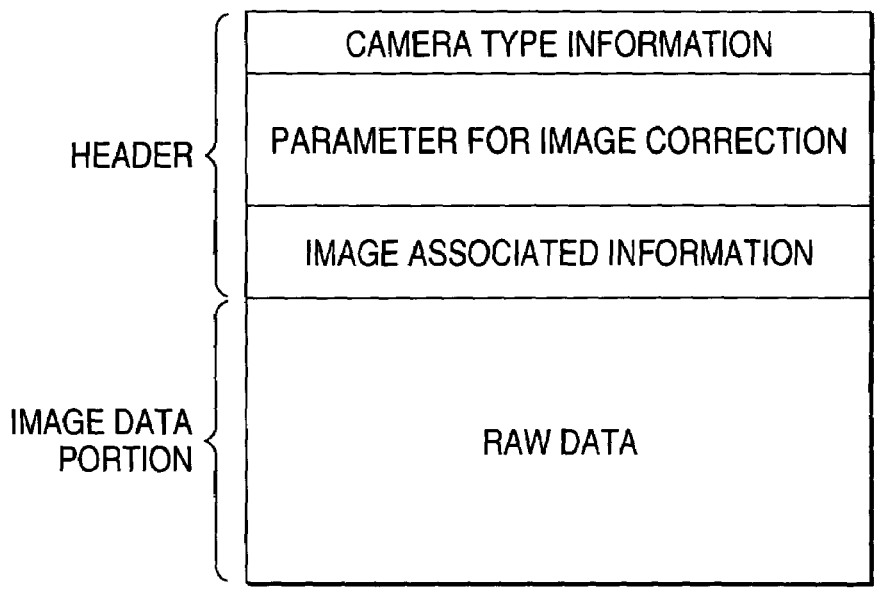
FIG. 2 is a diagram showing an example of data format for an image file recording RAW data.

FIG. 2 is a diagram showing an example of data format for an image file recording RAW data. The image file has a header and an image data portion. The header includes camera type information, a parameter for an image correction, and image associated information. The camera type information is used to specify the image pickup unit of a digital camera. The number of pixels, an image array, an analog signal process scheme and the number of bits for A/D conversion are specified by identifying the camera type. The image associated information includes pick-up conditions, such as a pick-up date, a shutter speed, an aperture value and an exposure mode.

Figure 3A:
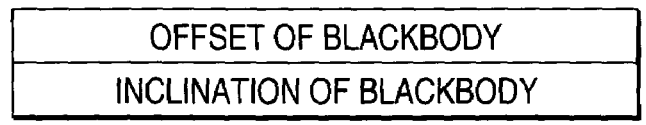
FIGS. 3A and 3B are diagrams showing an example of information indicating the shift of a blackbody locus.
Figure 3B:
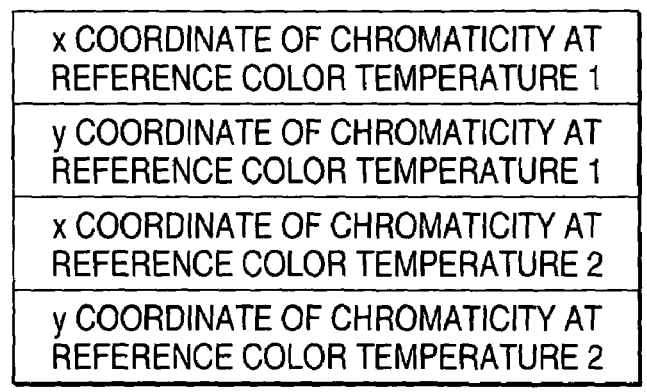

The image correction parameter is auxiliary information for processing to RAW data, and includes the information indicating the shift of the blackbody locus of each digital camera. As shown in FIG. 3A, the inclination value and the offset value can be employed as the information indicating the shift. As shown in FIG. 3B, the chromaticity information corresponding to a specific reference color temperatures maybe employed. It is preferable that multiple representative color temperatures are used as the reference color temperatures.

The RAW data output from the AD converter 5 are sequentially recorded to the image data portion in accordance with the number of pixels, the pixel array and the color (RGB) elements of the image pickup device 2.

The following explains The shift of the blackbody locus referring to FIG. 4 showing an xy chromaticity. In FIG. 4, a curve (1) represents a blackbody locus, and a curve (2) represents a blackbody locus of a digital camera A. Due to the characteristic difference, etc., of an image pickup device, the chromaticity of blackbody radiation of the digital camera A is output with being shifted as indicated by the curve (2).

As shown in FIG. 4, the curve (2) is shifted from the curve (1) in the y direction by distance "b", and is inclined by "a". Thus, inclination value "a" and offset value "b" are stored in the digital camera as information indicating the shifting in advance. The chromaticity information corresponding to specific color temperatures may be employed as information indicating specific shift. For example, as shown in FIG. 4, chromaticity information $(x_1, y_1)$ at color temperature 5000° K and $(x_2, y_2)$ at color temperature 3000° K are obtained for each digital camera, and is output as the information indicating the shift.

In FIG. 4, the shift of the blackbody locus is represented by the inclination value and the offset value. However, since the actual shift of the camera characteristic is not uniform, the above-information indicating the shift is stored as approximate data.

As described above, when the white balance control process to RAW data output by the digital camera that the blackbody locus is shifted is performed under a light source condition set in accordance with the color temperature, a color gain corrected based on the chromaticity information at designated color temperatures is employed.

In this embodiment, either the RAW data or the image data in an image signal form, which is appropriate for image reproduction on an image display unit, is selectively output. However, both the RAW data and the image data may be output. In this case, it is preferable that not only the information indicating the shift of the blackbody locus but also optical black correction data or tone correction data are included as an image correction parameter for the RAW data.

Second Embodiment

The second embodiment is assumed that an image is picked up under the condition that "auto white balance" was set as the white balance control, and "RAW data" was set as the recording mode. The digital signal processor 6 performs an auto white balance control process to the RAW data received from the A/D converter 5. The digital signal processor 6 further performs the gamma correction process, the interpolation process and the Y/C process to obtain image data that is an appropriate form to be able to display on the image monitor 11. The digital signal processor 6 outputs the obtained image data to the memory 7. The image monitor 11 displays a through image based on the image data. When the display of a through image is not required, the gamma correction, the interpolation process and the Y/C process are unnecessary to be performed.

When the release button (not shown) of the operation unit 12 is depressed in this state, the digital signal processor 6 performs the auto white balance control process to the received RAW data, and obtains a color correction gain corresponding to a pick-up scene. Thereafter, the digital signal processor 6 outputs the color correction gain with the RAW data to the memory 7.

The RAW data and the color correction gain data obtained by the auto white balance control process in the memory 7 are recorded through the media interface 10 on a recording media (not shown) with color gain data stored in advance in order to perform a white balance control process corresponding to a light source condition (outdoors, shade, illumination) that can be manually set. The image associated information is also recorded on the recording media (not shown) as one image file. The pick-up operation and the recording operation are controlled by the system controller 9. The color gain data based on the manual settings corresponding to the light source condition (outdoor, shade, illumination) are stored in a memory (not shown).

FIG. 2 is a diagram showing an example of data format for an image file recording RAW data. The image file has a header and an image data portion. The header includes camera type information, a parameter for an image correction, and image associated information. The camera type information is used to specify the image pickup unit of a digital camera. The number of pixels, an image array, an analog signal process scheme and the number of bits for A/D conversion are specified by identifying the camera type. The image associated information includes pick-up conditions, such as a pick-up date, a shutter speed, an aperture value and an exposure mode.

The image correction parameter is auxiliary information for processing to RAW data, and includes the color correction gain data for white balance control. As shown an example in FIG. 5, the color correction gain data is formed of color gain data (R gain, G gain and B gain) corresponding to a white balance set at the pick-up time and color gain data (R gain, G gain and B gain), which are adjusted in advance, corresponding to a light source condition (outdoor, shade, illumination). In this example shown in FIG. 5, "sun shinning", "shade", "fluorescent light D50" or "artificial daylight fluorescent light" can be set as the light source condition.

The RAW data output from the AD converter 5 are sequentially recorded to the image data portion in accordance with the number of pixels, the pixel array and the color (RGB) elements of the image pickup device 2.

In this embodiment, either the RAW data or the image data in an image signal form, which is appropriate for image reproduction on an image display unit, is selectively output. However, both the RAW data and the image data may be output. In this case, it is preferable that not only the color correction gain data used for white balance control but also optical black correction data or tone correction data are included as an image correction parameter for the RAW data.

Third Embodiment

The third embodiment is assumed that an image is picked up under the condition that "shade" was set as the white balance control, and "RAW data" was set as the recording mode. The digital signal processor 6 performs a white balance control process, which uses the color gain data set in advance, to the RAW data received from the A/D converter 5. The digital signal processor 6 further performs the gamma correction process, the interpolation process and the Y/C process to obtain image data that is an appropriate form to be able to display on the image monitor 11. The digital signal processor 6 outputs the obtained image data to the memory 7. The image monitor 11 displays a through image based on the image data. When display of a through image is not required, the white balance control process using the predetermined color correction data, the gamma correction, the interpolation process and the Y/C process are unnecessary to be performed.

When the release button (not shown) of the operation unit 12 is depressed in this state, the digital signal processor 6 performs the auto white balance control process to the received RAW data, obtains a color correction gain corresponding to a pick-up scene, and outputs. Thereafter, the digital signal processor 6 outputs the color correction gain data set manually corresponding to "shade" pick-up and the color correction gain data obtained by the auto white balance control process with the RAW data to the memory 7.

The RAW data, the color correction gain data corresponding to the white balance process set in advance, and the color correction gain data obtained by the auto white balance control process in the memory 7 are recorded through the media interface 10 on a recording media (not shown). The image associated information is also recorded on the recording media (not shown) as one image file. The pick-up operation and the recording operation are controlled by the system controller 9. The color gain data based on the manual settings corresponding to the light source condition (outdoor, shade, illumination) are stored in a memory (not shown), and are transmitted to the digital signal processor 6 with accordance to the settings of the operation unit 12.

FIG. 2 is a diagram showing an example of data format for an image file recording RAW data. The image file has a header and an image data portion. The header includes camera type information, a parameter for an image correction, and image associated information. The camera type information is used to specify the image pickup unit of a digital camera. The number of pixels, an image array, an analog signal process scheme and the number of bits for A/D conversion are specified by identifying the camera type. The image associated information includes pick-up conditions, such as a pick-up date, a shutter speed, an aperture value and an exposure mode.

The image correction parameter is auxiliary information for processing to RAW data, and includes the color correction gain data for white balance control. As shown an example in FIG. 6, the color correction gain data is formed of color gain data (R gain, G gain and B gain) corresponding to a white balance set at the pick-up time and color gain data (R gain, G gain and B gain) obtained by the auto white balance control process to the RAW data.

The RAW data output from the AD converter 5 are sequentially recorded to the image data portion in accordance with the number of pixels, the pixel array and the color (RGB) elements of the image pickup device 2.

In this embodiment, either the RAW data or the image data in an image signal form, which is appropriate for image reproduction on an image display unit, is selectively output. However, both the RAW data and the image data may be output. In this case, it is preferable that not only the color correction gain data used for white balance control but also optical black correction data or tone correction data are included as an image correction parameter for the RAW data.

What is claimed is:

1. A digital camera for outputting image information of image data received from an image pickup unit,
   wherein the image information having the image data includes information indicating a shift of a blackbody locus of the digital camera, and
   wherein the information indicating the shift of the blackbody locus of the digital camera characterizes a difference between a blackbody locus curve of the digital camera and a reference blackbody locus curve in a xy chromaticity space.

2. The digital camera according to claim 1, wherein the information indicating the shift of the blackbody locus of the digital camera includes an inclination value and an offset value.

3. The digital camera according to claim 2, wherein the inclination value and the offset value of the information indicating the shift of the blackbody locus of the digital camera are inclination and offset shifts in a y-direction of a blackbody locus curve of the digital camera from a reference blackbody locus curve in a xy chromaticity space.

4. The digital camera according to claim 1, wherein the information indicating the shift of the blackbody locus of the digital camera is chromaticity information corresponding to specific color temperatures.

5. The digital camera according to claim 4,
   wherein the chromaticity information of the information indicating the shift of the blackbody locus of the digital camera includes a plurality of (x, y) position values of a blackbody locus curve of the digital camera in a xy chromaticity space, and
   wherein each (x, y) position value corresponds to a particular color temperature.

6. The digital camera according to claim 1, wherein the outputted image data are image data that has not been subjected to white balance processing.

7. A digital camera, comprising:
   an image pickup unit configured to pickup an image to generate image data of the picked up image; and
   an output unit configured to output image information in a form acceptable to a device external to the digital camera,
   wherein the image information includes the image data, color gain information based on settings of the digital camera at an image pick-up time, and color gain data, which are adjusted in advance for various types of light sources, for white balance process that is set manually,
   wherein the image data, the color gain information based on settings of the digital camera at an image pick-up time, and the color gain data, which are adjusted in advance for various types of light sources, for white balance process that is set manually are outputted at substantially the same time.

8. The digital camera according to claim 7, wherein the output unit comprises a media interface configured to store the image information onto a removable recording media.

9. The digital camera according to claim 8, wherein the image data stored in the removable recording media is raw image data, wherein raw image data is image data that is not compressed.

10. The digital camera according to claim 8, wherein the output unit stores the image data, the color gain information based on the settings of the digital camera at the image pickup time, and the color gain data for white balance process that is set manually in a single file within the removable recording media.

11. The digital camera according to claim 7, wherein the image data outputted by the output unit are image data that has not been subjected to white balance processing.

12. A digital camera, comprising:
an image pickup unit configured to pickup an image to generate image data of the picked up image; and
an output unit configured to output image information in a form acceptable to a device external to the digital camera,
wherein the image information includes the image data, color gain information based on settings of the digital camera at an image pick-up time, and color gain information obtained by performing auto white balance process at the image pick-up time,
wherein the image data, the color gain information based on settings of the digital camera at an image pick-up time, and the color gain information obtained by performing auto white balance process at the image pick-up time are outputted at substantially the same time.

13. The digital camera according to claim 12, wherein the output unit comprises a media interface configured to store the image information onto a removable recording media.

14. The digital camera according to claim 13, wherein the image data stored in the removable recording media is raw image data, wherein raw image data is image data that is not compressed.

15. The digital camera according to claim 13, wherein the output unit stores the image data, the color gain information based on settings of the digital camera at the image pick-up time, and the color gain information obtained by performing auto white balance process at the image pick-up time in a single file within the removable recording media.

16. The digital camera according to claim 12, wherein the image data outputted by the output unit are image data that has not been subjected to white balance processing.

17. A digital camera for outputting image correction information, comprising:
an image pickup unit configured to pickup an image to generate image data of the picked up image; and
a signal processing unit configured to process the image data; and
an output unit configured to output image information to a device external to the digital camera,
wherein the image information includes the image data and the image correction information, and
wherein the image correction information includes a blackbody locus shift characteristic specific to the digital camera, and
wherein the information indicating the blackbody locus shift characteristic of the digital camera characterizes a difference between a blackbody locus curve of the digital camera and a reference blackbody locus curve in a xy chromaticity space.

18. The digital camera according to claim 17, wherein the blackbody locus shift characteristic of the digital camera includes inclination and offset values.

19. The digital camera according to claim 18, wherein the inclination value and the offset value of the blackbody locus shift characteristic of the digital camera are inclination and offset shifts in a y-direction of a blackbody locus curve of the digital camera from a reference blackbody locus curve in a xy chromaticity space.

20. The digital camera according to claim 17, wherein the blackbody locus shift characteristic of the digital camera includes chromaticity information corresponding to at least one predetermined color temperature value.

21. The digital camera according to claim 20, wherein the blackbody locus shift characteristic of the digital camera includes chromaticity information corresponding to a plurality of predetermined color temperature values.

22. The digital camera according to claim 20,
wherein the blackbody locus shift characteristic of the digital camera includes a plurality of chromaticity values, and
wherein each chromaticity value is a (x, y) position value of a blackbody locus curve of the digital camera in a xy chromaticity space corresponding to a particular color temperature.

23. The digital camera according to claim 17, wherein the output unit comprises a media interface configured to store the image information onto a removable recording media.

24. The digital camera according to claim 23, wherein the image data stored in the removable recording media is raw image data, wherein raw image data is image data that is not compressed.

25. The digital camera according to claim 17,
wherein the image information further includes camera type information or image associated information, or both,
wherein the camera type information includes information to specify the image pickup unit of the digital camera, and
wherein the image associated information includes at least one of an image pickup date, a shutter speed, an aperture value, and an exposure mode.

26. The digital camera according to claim 25, wherein the output unit stores the image data, the camera type information, the image correction information and the image associated information in a single file onto a removable recording media.

27. The digital camera according to claim 17, wherein the image data included in the image information outputted by the output unit are image data that has not been subjected to white balance processing.

* * * * *